United States Patent [19]
Blomqvist

[11] Patent Number: 4,767,086
[45] Date of Patent: Aug. 30, 1988

[54] TIGHTENING DEVICE FOR CABLE BUSHINGS

[75] Inventor: Mikael Blomqvist, Karlskrona, Sweden

[73] Assignee: Lycab AB, Karlskrona, Sweden

[21] Appl. No.: 39,071

[22] Filed: Apr. 16, 1987

[30] Foreign Application Priority Data

Apr. 28, 1986 [SE] Sweden ............................. 8601958

[51] Int. Cl.⁴ ........................ F16L 5/00; H02G 3/22
[52] U.S. Cl. ..................................... 248/56; 174/48; 174/151
[58] Field of Search ................ 248/56, 68.1, 49, 65, 248/70, 74.4, 354.3; 174/48, 151; 269/111

[56] References Cited

U.S. PATENT DOCUMENTS

| | | | |
|---|---|---|---|
| 1,572,856 | 2/1926 | Watson et al. | 248/354.3 X |
| 2,732,226 | 1/1956 | Brattberg | 248/68.1 X |
| 4,376,230 | 3/1983 | Bragsten | 248/56 X |

FOREIGN PATENT DOCUMENTS

| | | | |
|---|---|---|---|
| 146193 | 6/1985 | European Pat. Off. | 248/56 |
| 2524113 | 5/1975 | Fed. Rep. of Germany | 248/56 |
| 0183300 | 4/1986 | Sweden | 248/56 |

Primary Examiner—Alvin C. Chin-Shue
Attorney, Agent, or Firm—Cushman, Darby & Cushman

[57] ABSTRACT

The invention relates to a tightening device for cable bushing arrangements comprising a rigid frame structure having packing pieces of which at least one presents a cable-accommodating hole. The packing pieces are arranged in rows to fill the frame structure from one end. The tightening device includes a pressure plate located between the frame structure and the adjacent row of packing pieces, and a tightening element between the frame structure and the pressure plate to press the pressure plate against the rows of packing pieces. According to the invention, this screw element comprises a screw means connected to the pressure plate and projecting therefrom for abutment with the frame structure. The free end of the screw is movable in relation to the pressure plate to produce a pressing action between the plate and the frame structure. The screw element may comprise at least two parts joined together by screwthreads and, when rotated relative to one another, changing the length of the screw element. One part of the screw element is attached to the pressure plate and axially immovable in relation thereto.

4 Claims, 1 Drawing Sheet

TIGHTENING DEVICE FOR CABLE BUSHINGS

BACKGROUND OF THE INVENTION

The invention relates to a tightening device for use with a cable bushing or leadthrough arrangement of the kind which comprises a rigid frame structure having arranged therein a plurality of packing pieces, of which at least one presents a throughpassing cable-accommodating hole and which are placed in rows in the frame structure so as to fill the space in the frame structure from one end thereof, and which tightening device comprises a pressure plate which is located between the other end of the frame structure and the row of packing pieces located nearest said other end, and further comprises a tightening element which is arranged between said other end of the frame structure and the pressure plate for urging the pressure plate against the rows of packing pieces.

Cable bushings or leadthrough arrangements of this kind are well known to the art and are used to lead cables through walls and like structures. The frame of the cable bushing arrangement is secured in an aperture in the wall and the cables are passed through holes presented by the packing pieces, whereafter the rows of packing pieces are pressed together in the frame structure, with the aid of a tightening device that comprises a pressure plate and a co-acting tightening element. This known tightening element normally has the form of a screw which is passed through the frame structure and one end of which presses against the pressure plate. The other end of the screw is thus located externally of the outer surface of the frame structure, and hence provisions must be made which will enable this end of the screw to be reached, so that the screw can be turned. To avoid this, cable bushing arrangements are known with which the frame structure is provided with an outwardly directed sleeve in which the tightening screw is screwed-in from within the frame structure. Although the screw of this arrangement can be manipulated from within the frame structure, it is necessary to form in the wall in which the cable bushing is to be fitted a recess for accommodating the outwardly projecting sleeve. Thus, both of these known cable bushing arrangements have the drawback that the frame, structure has projecting externally thereof parts which must be let into the wall in which the cable bushing is to be fitted.

SUMMARY OF THE INVENTION

The object of the present invention is to provide for cable bushing arrangements of the aforesaid kind, a tightening device which avoids the aforedescribed drawbacks, which enables the tightening element to be manipulated from within the frame structure, and which avoids the need for parts which project outwardly of the frame structure. This object is achieved in accordance with the invention with a tightening device of the aforedescribed kind that has the characterizing features set forth in the characterizing clause of claim 1.

Further developments of the invention are defined in the depending claims.

BRIEF DESCRIPTION OF THE DRAWING

The invention will now be described in more detail with reference to the accompanying drawing, in which.

DETAILED DESCRIPTION OF A PRESENTLY PREFERRED EMBODIMENT

Figure 1:
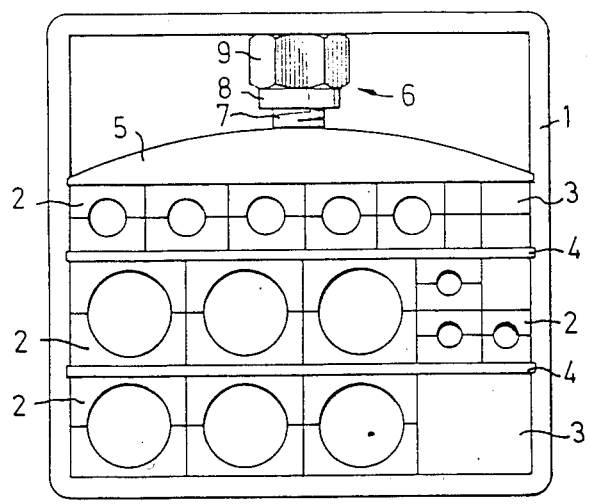
FIG. 1 is a front view of a cable bushing arrangement provided with a tightening device according to one embodiment of the invention.

FIG. 1 illustrates a cable bushing or leadthrough arrangement which comprises a rigid, generally rectangular frame-structure 1 in which there is arranged a plurality of packing pieces 2 and 3. Each packing piece 2 presents a throughpassing cable-accommodating hole and is divided into two parts along its centre plane, so that the packing device can be fitted around the cable for which it is intended. The cables are not shown on the drawing. The packing pieces 3, however, are imperforate and are used merely as filling bodies, so that all the rows in the frame structure 1 are filled. Mutually adjacent rows of packing pieces 2, 3 have arranged therebetween a supporting plate 4 which is forked at the ends thereof for engagement with the side members of the frame structure and which is effective in holding the rows of packing pieces 2, 3 in their respective positions.

Located in the frame structure 1 above the top row of packing pieces 2 and 3 is a tightening device according to the present invention. This device comprises a pressure plate 5 which is made of a rigid material and which is intended to exert pressure on the uppermost row of packing pieces 2 and 3. To this end the tightening device incorporates a tightening-screw assembly 6 located between the pressure plate 5 and the opposing inner surface of the frame structure 1.

Figure 2:
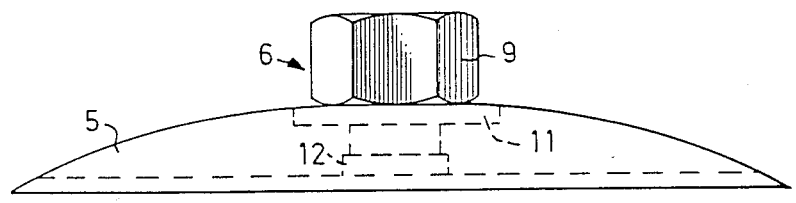
FIG. 2 is an enlarged view of the tightening device illustrated in FIG. 1.
Figure 3:
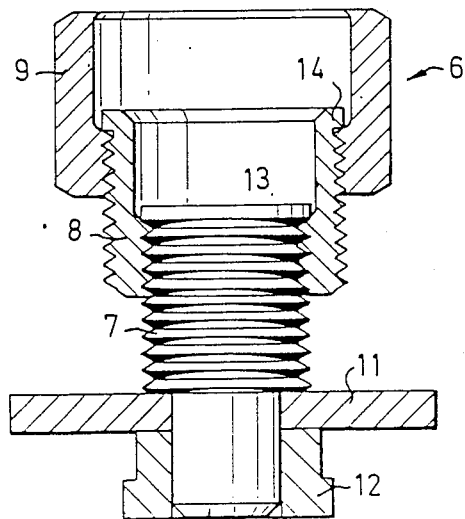
FIG. 3 is a sectional view of the tightening element used in the tightening device illustrated in FIGS. 1 and 2.

The pressure plate 5 and the tightening-screw assembly 6 are illustrated in larger scale in FIG. 2, and the tightening-screw assembly 6 is also illustrated in section in FIG. 3. It will be seen from FIG. 3 in particular that the tightening-screw assembly 6 is comprised of three parts 7, 8 and 9. The part 7 is in the form of an externally screw threaded spindle section having at one end thereof a peg or neck 10 which is of smaller diameter than the spindle section and which have fitted thereto a washer plate 11 and a thrust ring 12. When the pressure plate 5 is made from a plastics material, the washer plate 11 and the thrust ring 12 may be firmly mounted on the peg 10 and then mounted into the pressure plate. If, on the other hand, the pressure plate 5 is made of steel or some similar material, the washer plate 11 is first mounted on the peg 10 and the peg then inserted through a hole provided herefor in the pressure plate 5, whereafter the thrust ring 12 is pressed firmly onto the peg 10 from the opposite side of the pressure plate 5. The- spindle section 7 of the tightening screw assembly 6 is thus axially immovable in relation to the pressure plate 5, subsequent to assembly.

The part 8 of the screw assembly 6 comprises a sleeve which is provided with both an external and an internal screwthread and which is screwed onto the spindle part 7. As illustrated in FIG. 3, the part or sleeve 8 has a plain section 13 at one end thereof, which limits the extent to which the part 8 can be displaced along the part 7. The part 9 of the screw assembly 6 is also in the form of a sleeve, which has an internal screwthread corresponding to the external screwthread on the part 8 and which presents at its upper end a plain section 14, which limits the extent of axial movement of the part 9 in relation to the part 8. As illustrated in FIGS. 1 and 2, the part 9 of the screw assembly has a hexagonal external configuration, presenting flats for spanner engagement.

FIG. 2 illustrates the tightening screw assembly 6 when contracted to its fullest extent, and FIG. 3 illustrates the assembly when fully extended. A comparison between these Figures shows that the screw assembly 6 can be considered to form a telescopic screw, the length of which can be adjusted by mutual rotation of the three screw parts 7, 8 and 9. Thus, the parts 7, 8 and 9 of the tightening screw assembly 6 can be screwed together to the positions illustrated in FIG. 2, in which the screw assembly has but a small axial extension and will thus take up but a very small space in this direction, and can be screwed-out, subsequent to fitting the pressure plate 5 in the frame structure 1, to the length required for the outer extremity of the screw part 9 to abut the aforesaid opposing inner surface of the frame structure 1 and produce on the pressure plate 5 the thrust required to compress the rows of packing pieces 2 and 3 and therewith securely hold the cables in their respective bushings.

When the cable bushing arrangement is used in conjunction with a tightening device constructed in accordance with the present invention, the arrangement can be readily manipulated, because the tightening screw assembly 6 is located within the frame structure 1 and can therewith be easily reached. Furthermore, the frame structure requires no inwardly projecting parts, which greatly facilitates fitting of the frame structure. In addition hereto, the manner in which the inventive screw assembly is constructed means that when the aforesaid screw parts are all screwed fully home in relation to one another, the screw assembly will take up but a relatively small space, but can nevertheless be extended within a relatively wide range.

It will be understood that the invention is not restricted to the aforedescribed exemplifying embodiment, but that modifications can be made within the scope of the following claims.

I claim:

1. A tightening device for a cable bushing or lead-through arrangement, comprising:

a rigid frame structure having two opposite ends;

a plurality of packing pieces arranged in said frame structure in a plurality of rows each running generally parallel to said ends, in a series which extends in said frame in a direction generally normal to said ends;

at least one of said packing pieces having a cable-accommodating hole provided therein;

said rows of packing pieces partially filling said frame structure, beginning at one said end and ending short of an opposite said end, so as to leave a space in said frame structure between a respectively nearest row and said opposite end;

a pressure plate disposed in said space, between said opposite end and said nearest row;

a tightening element disposed in said space, between said opposite end and said pressure plate for urging said pressure plate against said nearest row of packing pieces so as to compress said rows of packing pieces in said direction against said one end of said frame structure;

said tightening element comprising a tightening screw extending in said direction, said tightening screw being connected at one end with said pressure plate and extending in said space from said pressure plate towards said opposite end of said frame structure and having an opposite end arranged for engaging said opposite end of said frame structure;

said tightening screw comprising at least three serially interconnected parts at least three of which are threadedly telescopically-interconnected screw-threaded parts, an end one of which is axially-immovably connected with said pressure plate and an opposite end one of which is positioned to engage said opposite end of said frame structure, whereby said rows of packing pieces may be compressed between said one end of said frame structure and said pressure plate, by rotating said screw-threaded parts relative to one another until said opposite end part of said telescoping screw engages said opposite end of said frame structure and further relative rotation of at least one of said telescopically-interconnected screw-threaded parts places said tightening screw in compression between said opposite end of said frame structure and said pressure plate.

2. The tightening device of claim 1, wherein:

said tightening screw is provided with engageable shoulder means, at least one of which is provided on at least one of said telescopically-interconnected screw-threaded parts, which are engageable for limiting telescopic extension of said tightening screw for preventing over-compression of said rows of packing pieces between said pressure plate and said one end of said frame structure.

3. The tightening device of claim 1, wherein:

said pressure plate has an opening therein extending in said direction, said end one of said tightening screw parts being received in said opening and secured therein by an attachment means.

4. The tightening device of claim 3, wherein:

said attachment means comprises a washer plate fitted in a recess in said pressure plate around said opening at an inner end thereof, and a flanged thrust ring fitted into said opening from an outer end thereof; and said end one of said tightening screw parts having a non-threaded peg portion fitted through said washer plate into secure engagement with said thrust ring.

* * * * *